Dec. 5, 1939.   C. R. KUZELL   2,182,129
METALLURGY
Filed March 23, 1938   2 Sheets-Sheet 1

Fig. 1.

INVENTOR
Charles R. Kuzell
BY
Pennie, Davis, Marvin & Edmonds
ATTORNEYS

Dec. 5, 1939.   C. R. KUZELL   2,182,129
METALLURGY
Filed March 23, 1938   2 Sheets-Sheet 2

INVENTOR
Charles R. Kuzell
BY
Pennie, Davis, Marvin & Edmonds
ATTORNEYS

Patented Dec. 5, 1939

2,182,129

UNITED STATES PATENT OFFICE 2,182,129

METALLURGY

Charles R. Kuzell, Clarkdale, Ariz., assignor to Phelps Dodge Corporation, New York, N. Y., a corporation of New York Application March 23, 1938, Serial No. 197,609

33 Claims. (Cl. 75—63)

This invention relates to metallurgy and has for an object the provision of an improved metallurgical process. More particularly, the invention contemplates the provision of an improved process for dissecting and recovering metals from metal-bearing materials of secondary origin such, for example, as: light and heavy scrap brass and bronze, dross, skimmings, ashes, refuse, irony brass, irony copper, sweated radiators, black copper, excess trimmings and cuttings from manufacturing operations and refinery slags, containing nickel, copper, zinc, lead, tin, antimony, bismuth and similar metals.

In view of economic conditions prevailing during recent years, the recovery of the metal components and constituents of metal-bearing materials of secondary origin has become a matter of considerable importance, and many metallurgical concerns which formerly dealt substantially exclusively in the treatment of metal-bearing materials of primary origin have entered the field. Therefore, this branch of the metallurgical industry has become highly competitive, with the result that the quality of the materials available for treatment is low and the margin of profit permitted in employing recovery methods or processes of the heretofore customary type is very small. Consequently the development of a more effective and more economical recovery method or process is highly desirable.

The treatment of metal-bearing materials of secondary origin of all grades and characters presents many technical problems, and before this branch of the industry became highly competitive, it was customary rather carefully to select the materials to be treated from those available in order to avoid the necessity of treating the more refractory materials and thus provide for obtaining a suitable margin of profit. With the expansion of this branch of the industry and the consequent development of severe competition for materials for treatment, the business of collecting salvaged metal-bearing materials has been so extended that large quantities of relatively low-grade materials are now being offered for treatment, and plant operators are faced with the necessity of accepting such materials for treatment or curtailing operations.

As hereinbefore indicated, it was customary, heretofore, to select for treatment materials relatively free from large quantities of undesirable or objectionable impurities and relatively simple in the aggregation of metallic alloying ingredients, and the field of application of processes of the type employed in treating such materials has not been extended satisfactorily to cover the entire range of materials now available for treatment. Furthermore, many of the processes employed heretofore have been found to be deficient in yielding a sufficiently high recovery of some of the alloying metals, even when applied to the treatment of relatively pure and relatively simple alloys, and many of such processes are complicated and comprise a multiplicity of operations which cause high operating costs and which require high capital expenditures for installation of apparatus. For example, some of the more commonly available relatively simple secondary materials are copper base alloys containing zinc, lead and tin, which also frequently contain iron. It has been proposed, heretofore, to subject such materials to oxidizing treatments while molten to fume off the zinc and a portion of the tin. When the charge contains iron, undesirable quantities of slag are produced, which slag ties up and carries off tin and lead. Consequently, in order to avoid excessive tin and lead losses, it is necessary either to select the charge materials with extreme care to avoid the inclusion of iron or to employ additional processes to recover the tied-up portions of the tin and lead. Such additional processes are expensive and frequently so expensive as to yield the additional metals at too high costs. Similar difficulties are encountered when the initial materials contain substantial quantities of silica, alumina and other slag-forming ingredients.

The present invention is directed toward the accomplishment of high percentage of recovery of the various ingredients in metal-bearing materials of secondary origin and even in complex alloys and other metal-bearing materials containing high percentages of foreign impurities by a simplified method, thus to enlarge the range of materials amenable to economic treatment for the separation and recovery of the valuable ingredients. The invention may be employed with particular advantage in the treatment of metal-bearing materials of secondary origin containing tin when the recovery of tin is important, materials such, for example, as those consisting largely of copper and containing iron in addition to copper and tin. The process of this invention is such that slag-making ingredients such as iron, silica and alumina can be received in the initial materials to be treated and a satisfactory recovery made of the valuable ingredients contained in the materials in a simple and economical manner. The process of the invention employs the principle of controlled oxidation followed by controlled reduction, both operations contributing to an orderly dissection of the various metals and to a high yield of the respective ingredients, either alone or in simple combinations so concentrated that any subsequent treatment necessary for preparation of the products in marketable form is relatively economical.

The process of the invention involves the treatment of the metal-bearing materials while molten or while being melted with oxidizing gases such as air to fume off portions of the volatile metals contained therein, and treatment of the residual molten materials with reducing agents to reduce metals oxidized during the oxidizing treatments and to effect vaporization of additional quantities of the volatile metals. During the oxidizing and reducing treatments, the molten baths are maintained, preferably, at temperatures above the melting point of zinc.

The duration of the oxidizing treatment and the degree of oxidation accomplished in any case will be determined by the nature of the charge undergoing treatment and by the results sought to be achieved. For example, in the treatment of a charge containing copper, zinc and tin, oxidation may be carried out as by passing air through the charge in the form of a molten bath, to the point at which substantially all of the zinc and substantially all of the tin have been converted to zinc oxide and tin oxide, respectively, with the copper remaining largely or substantially entirely in the metallic state, or, oxidation may be controlled to effect the oxidation of substantially all of the zinc but of only a portion of the tin, the balance of the tin and substantially all of the copper remaining in the metallic state. It is impossible to avoid oxidation of some of the tin, but oxidation can be controlled readily to avoid oxidation of the major portion of the amount present ordinarily in tin-bearing secondary materials containing zinc and copper. Also, a portion of the copper will almost invariably be oxidized, but the amount oxidized can be quite easily controlled. It may be desirable to continue the oxidizing treatment at the point at which substantial oxidation of copper is effected to insure the elimination of more readily oxidizable metals.

The oxidation treatment normally results in the production of a molten bath comprising at least two phases, a molten metal phase consisting essentially of copper, but which may contain, also, unoxidized portions of the other metals originally present, and a molten slag phase containing metal oxides and other slag-forming ingredients of the charge.

During the oxidation treatment, a portion of the zinc leaves the charge in the form of a zinc oxide fume which is collected. The remainder of the zinc oxide produced remains on the surface of the molten charge with other slag-forming substances present in the initial charge or produced by oxidation. The amount of zinc fumed off will be maximum with the presence in the bath of the minimum amount of silica and will be lessened as the silica increases.

A portion of the tin may be vaporized during the oxidation treatment and collected as tin oxide with the zinc oxide fume. The amount of tin vaporized in the treatment of a charge of any particular tin content will depend to some extent upon the duration of the oxidation treatment. Thus, if the oxidation treatment is discontinued at about the time substantially all of the zinc becomes oxidized, only a relatively small proportion of the tin will be oxidized, and, of the tin oxidized, only a small proportion will be vaporized, the balance of the tin remaining in the slag phase in the oxidized state. Any desired additional amount or all of the tin may be oxidized by continuing the oxidation treatment beyond the point at which substantially all of the zinc becomes oxidized. When additional amounts of tin are oxidized, additional amounts will be vaporized. All of the vaporized tin may be collected in the form of tin oxide with the zinc oxide fume, or, in the later stages of the oxidation treatment, a separate fume containing a larger proportion of tin oxide may be collected.

If the initial metal-bearing materials contain lead as well as copper, zinc and tin, procedures substantially the same as those described above may be employed in the oxidation treatments. The behavior of the lead will be similar to that of the tin. If iron is present also, it is the first metal oxidized, and its oxidation is completed before that of the zinc. The iron oxides formed are not volatile at the temperatures employed, and so they will remain substantially entirely in the slag.

When the oxidation treatment has continued to the desired point, treatment with the oxidizing gas is discontinued, and the residual material is treated with a reducing agent to reduce to metallic form the zinc and tin oxides formed during the oxidaiton treatment. The end-point of oxidation treatment may be determined in any suitable manner for operating purposes, as, for example, by suitable physical or chemical analyses or by observaiton of the molten bath and the gases issuing from the bath. Observation of the gases issuing from the bath provides a suitably reliable indication of the degree of oxidation for a capable operator, gradual reduction in the rate of production of oxide fume showing the gradual elimination of volatile metals such as zinc and tin from the metal phase of the bath.

The metallic and slag phases may be subjected to the reducing treatment separately or together, if treatment of the metal phase by reduction is desirable. The metal phase may be in such condition as a result of the oxidation treatment that treatment by reduction will be undesirable, or, that another type of treatment will be more desirable. Thus, for example, when substantially all of the zinc (or zinc and iron) has been eliminated from a bath with retention in the metal phase of a large proportion of the tin (or tin and lead) with the metallic copper, the metal phase may be subjected advantageously to an electrolytic refining treatment for the recovery of metallic copper and a slime product containing a large proportion of tin (or tin and lead). Also, substantially complete elimination from the metal phase of all readily oxidizable metals such as iron, zinc, tin and lead may leave a molten metal phase consisting almost entirely of copper and which may be treated most advantageously by electrolysis for the production of a marketable copper product.

When the slag and metal phases of the bath resulting from the oxidation treatment are subjected to the reduction treatment while in contact, the reduction treatment may be so conducted as to accomplish substantially complete reduction of the tin oxide or the tin and lead oxides contained therein, or, only fractional reduction of these oxides may be carried out while the two phases are in contact. When fractional reduction is practiced, the two phases are separated when the desired quantities of the oxidized metals have been reduced, and the separated phases may be further treated according to any procedure herein referred to.

Subsequent treatment of the oxidized material, following the oxidation treatment may be the same for the slag and metal phases when treated separately as when the slag and metal are treated in contact.

The reducing treatment of the slag and metal phases separately or in contact may be carried out advantageously by blowing a reducing agent through the molten material. The reducing agent may comprise a solid carbonaceous material such as coke, coal or carbon, or powdered preparations of these agents mixed with an inert carrier gas such as nitrogen or steam, with restricted amounts of air, or with a gaseous carbonaceous material such as carbon monoxide alone or mixed with an inert carrier gas such as nitrogen, as in the case of producer gas. Hydrocarbon gases, raw or reformed, may be used. Any other suitable solid or gaseous reducing agent may be employed. When a solid reducing agent is employed, it may be placed on the surface of the molten bath, and air may be blown through the molten bath to effect partial combustion of the reducing agent, by reaction of the reducing agent and the oxygen of the air, with the creation of a reducing atmosphere or environment. During the course of the reducing treatment, the temperature of the molten material is maintained sufficiently high to effect vaporization of the elemental zinc produced under the prevailing conditions (the gases passing through the bath aid in sweeping out the volatile metals) and the vaporized zinc after leaving the molten bath is oxidized by means of air introduced above the bath or which filters into the flue leading from the molten bath receptacle to the fume collecting apparatus.

The reducing treatment is continued until the oxides of zinc and tin are reduced to a satisfactory degree. After reduction of the zinc oxide has been substantially completed the reducing operation may be continued unaltered until substantially all of the tin oxide has been reduced or it may be altered by the introduction into the bath of a sulphur yielding substance to effect the production of volatile tin sulphide with the metallic tin produced. If the reducing operation is continued unaltered, after reduction of the zinc oxide, until the tin oxide has been reduced to the desired degree, the metallic tin will enter the metal of the bath (the metal phase resulting from the oxidation treatment if the slag and metal phases are reduced in contact or a new metal phase resulting from reduction if the slag is treated separately) and it may be separated therefrom in any suitable manner. Thus, for example, the slag may be separated from the metal of the bath and the metal may then be subjected to the action of a sulphur yielding substance to effect the production and vaporization of tin sulphide, or a gas containing chlorine, sulphur chloride or other suitable chlorinating agent may be passed through the molten metal to effect the production and vaporization of tin chloride, or the metal may be cast into anodes and the tin and copper may be separated electrolytically. The metal and slag in contact may be treated with chlorine or a chlorine-yielding substance to effect the production and vaporization of tin chloride. This procedure is carried out, preferably, after reduction of the tin oxide of the slag, under non-reducing conditions to avoid the reduction of iron oxide with the resulting production of volatile ferric chloride.

When the slag and metal phases resulting from the oxidation treatment are further treated separately, the process may be carried out in a cyclic manner. In this case, the reduction treatment may be so controlled as to produce a new metal phase containing in variable and controllable amounts and proportions some or all of the metals originally present in the charge, and this new metal phase may be employed as the nucleus of a new charge for treatment in the process.

The initial materials treated in accordance with the invention may be either solid materials of the nature of those hereinbefore referred to or they may be molten materials such, for example, as molten black copper or mattes containing metals such as copper, zinc, lead and tin.

The heat required for the melting operation when the initial material is solid may in some instances be supplied through the heat liberated by the oxidation of some of the ingredients in the initial materials, such as the heat liberated by the combustion or oxidation of zinc, lead, tin and iron. If the materials to be melted include too much of a burden of non-combustible material, the heat required for the melting operation is partially supplied by extraneous fuel. After the materials are completely melted, if the course of the oxidation has not proceeded to a satisfactory end-point, the oxidation of the bath may be intensively continued until such a point is reached.

The amount of elements fumed off or volatilized by this oxidizing operation will depend on several factors, such as the volatility of the particular metals undergoing oxidation, the volatility of their oxidation products, the presence of any other ingredients, such as, for instance, sulphur, which forms a compound with any of the ingredients making it more or less volatile at the prevailing temperatures, and slag forming substances like silica. The amount of elements fumed off or volatilized will depend also upon the character of the gaseous atmosphere contacting the surface of the molten bath. Some of these factors can be altered by the operator if the operator desires the fuming to proceed selectively, which consideration will result from the combination of metals being treated and the character of the process to which the concentrated products are to be subjected. For instance, by varying the oxidizing or reducing power of the gaseous atmosphere on the bath, one may selectively obtain a fume which is predominantly a zinc-bearing fume, retaining substantially all the lead and tin in the bath at the end of the oxidizing period. Because the sequence of oxidation of the metals is iron, zinc, tin, lead, copper, one may also selectively obtain a fume which is predominantly a zinc-bearing fume and retain substantially all the lead and tin in the metal phase of the bath by terminating the oxidation treatment at the point at which the zinc has become substantially completely oxidized. Substantially all of the iron present in the initial charge will enter and remain in the slag phase in the oxidized state.

The oxidizing treatment is discontinued when the oxidation of the bath has been carried to a desirable end-point. For instance, in the melting and oxidizing of a charge of material consisting of copper base alloys such as brass, bronze, irony brass, skimmings and ashes from brasses and bronze foundries, revert slag from refineries, the oxidation period is terminated when all of the iron and a small portion of the copper are oxidized. The oxidation of a small part of the copper will be evidence to the operator that the oxidation of all of the other more easily oxidizable elements has been thoroughly accomplished.

The melting and oxidizing step of the process may be facilitated by the use of hot air blast which may be heated advantageously by exchanging the heat present in the waste gases from the operation, and the energy necessary to supply the blast may be obtained from steam produced by absorbing only a part of the heat of the waste gases not necessary for heating the blast. Such apparatus as a boiler, for the production of steam by means of heat contained in the waste gases, and a heat exchanger, for heating the blast by means of heat contained in the waste gases, will also provide the means of cooling the waste gases so that they may be safely treated in a bag house or Cottrell plant or by other devices for the filtering out, precipitation or separation of the fume content.

After the intensive oxidation period of the process has been terminated, the molten bath will consist of at least two phases, one an oxide or a slag phase, and the other a metallic phase consisting essentially of molten copper. The subsequent step in the process is primarily that of introducing a reducing agent onto, into or through the bath. This may be done without separating the two phases of the bath or, if the metallic portion has been sufficiently purified with respect to oxidizable and volatile metals, as will be the case in the treatment of many of the initial metallic materials containing copper, the metallic phase of the bath may be separated and sent to a refining operation, such as an electrolytic copper refinery. The termination of the oxidation period may also be so regulated that most of the tin and lead remains unoxidized and is left in the metallic phase which may be separated and sent to a refinery operation, as preferred by the operator. This separation is not necessary and can be done or not within the discretion of the operator.

The total bath consisting of both fluid phases can be treated without separation by the reducing step of the process or either phase may be treated. This step may consist in introducing a reducing agent through the bath as, for instance, by blowing a gas such as producer gas or reformed gas produced by cracking and partial combustion of hydrocarbons through one or more tuyères which may be submerged so that their outlets are under the surface of the bath. The reducing agent may or may not be preheated, as desired or required. As the reducing agent rises through the bath, it reduces the oxides back to the metallic condition in the order of their relative reducibility. If such reduced metals are volatile they will rise from the bath and enter the waste gases. Zinc, for instance, is of this type, and, as fast as it is reduced to the metallic condition from the oxide form, it may be swept out of the bath into the waste gases above the bath. At this point it will be desirable but not necessary to introduce secondary air for consuming the unburned combustible materials from the reducing agent and also for oxidizing the metallic zinc back to a zinc oxide fume which will proceed through the cooling apparatus provided for the waste gases and will be collected in the bag house, Cottrell plant or other device provided for its separation. Satisfactory reduction may also be accomplished by the introduction or placing of a solid reducing agent such as coke on the surface of the bath, followed by agitation with air blasts introduced in regulated quantities through tuyères discharging just under or across the inter-surface of the coke and bath, regulation of the air being such as to establish a reducing influence from the air and coke combination.

When the reducing operation has proceeded to the point that the higher oxides of iron have been reduced to the degree of oxidation corresponding to FeO, any copper oxide present in the oxide or slag phase of the melt will have been reduced to the metallic form and will have joined the metallic portion of the bath. When this stage is reached, any zinc which remains in the bath after the termination of the oxidation blow will also have been reduced and eliminated from the bath and the absence of zinc in the waste gases will be the visual means of determining the stage to which the reducing operation has been carried. At this point elemental sulphur or other sulphur-yielding material may be introduced either through an opening in the vessel so that the material will become incorporated in the bath, or it may be introduced by the stream of reducing agent. The sulphur yielding material, however, is desired only if the bath contains such elements as tin, lead and others whose sulphides are volatile at the prevailing temperature at which the operation is being carried out. Tin, for example, is not a volatile metal at ordinary furnace temperatures, the vapor pressure being quite low at the temperature necessary to keep the bath molten. Likewise, the oxide of tin is rather refractory and has a very low vapor pressure. On the other hand, stannous sulphide (SnS) is a compound of tin which has a very high vapor pressure and even boils at temperatures which are required to keep the bath molten. Therefore, the addition of the sulphur yielding substance and the continuation of the blowing with the reducing agent will cause the tin to be swept out of the bath as tin sulphide, and it will pass out of the vessel with the waste gases as the sulphide or oxide, depending on whether provision has been made for secondary oxidation above the bath. The same thing is true of lead, the sulphide being a compound which facilitates the volatilization and separation of lead from the bath.

The quantity of sulphur yielding material added will be determined by the operator according to the amounts of the metals in the bath which he desires to remove through the aid of sulphur, and the operator will also provide a satisfactory margin of safety in the addition of the sulphur yielding material in order that enough sulphur will be present to contact with and remove the metals so to be removed.

The end-point of the continued blowing with the reducing agent will be manifested by the fading out of the volatilized metals or their compounds as observed in the appearance of the gases. When this stage is reached the content of the oxide or slag portion of the melt will have been so reduced with respect to the metals to be recovered that this phase of the molten bath may be discharged from the vessel by running off and skimming by approved and well-known methods. If the residual metal bath has picked up any excess sulphur or any other oxidizable ingredient, then by blowing the bath with an air blast such impurities can be eliminated as in regular converting operations. The residual metal bath is then ready for removal from the furnace for subsequent refining operations, if such refining operations are necessary to separate precious metals or to prepare the product for market.

The following test data illustrate the oxidation treatment and show the progressive changes in composition of the slag and metal which take place during the course of the treatment:

Example I

A batch of material of the following analysis was melted: copper 45%, $SiO_2$ 11%, Fe 9%, S 0.6%, Zn 16%, Sn 1%, Pb 2%, $Al_2O_3$ 4%, CaO 2%.

The procedure consisted of sampling the melt, (Sample 1) then blowing air through two tuyères under 5 lbs. pressure for 10 minutes, (Sample 2) punching the tuyères, and repeating the blow in 10 minute periods until its total duration was 50 minutes (Samples 3, 4, 5 and 6 respectively).

Progressive analyses of slag:

| Sample | Percent Sn | Percent Cu | Percent Zn | Percent Pb | Percent $SiO_2$ | Percent Fe | Percent $Al_2O_3$ | Percent S | Percent CaO |
|---|---|---|---|---|---|---|---|---|---|
| 1 | 0.1 | 1.4 | 4.9 | 0.7 | 38.6 | 22.9 | 16.4 | 0.1 | 4.4 |
| 2 | 0.2 | 5.8 | 3.2 | 0.6 | 32.9 | 29.6 | 9.4 | 1.5 | 3.3 |
| 3 | 0.3 | 4.8 | 3.2 | 0.7 | 28.7 | 31.2 | 10.1 | 0.9 | 3.0 |
| 4 | 0.9 | 4.9 | 2.9 | 2.2 | 24.4 | 29.9 | 10.6 | 0.1 | 2.7 |
| 5 | 1.5 | 6.0 | 2.8 | 1.2 | 21.0 | 29.2 | 9.2 | Tr. | 2.4 |
| 6 | 2.3 | 7.8 | 2.7 | 0.5 | 19.6 | 27.3 | 9.8 | Nil | 2.4 |

Progressive analyses of metal:

| Sample | Percent Sn | Percent Cu | Percent Zn | Percent Pb | Percent Fe |
|---|---|---|---|---|---|
| 1 | 4.2 | 71.9 | 14.0 | 6.9 | 5.8 |
| 2 | 5.0 | 84.0 | 3.7 | 7.1 | 2.6 |
| 3 | 5.1 | 88.3 | 1.8 | 7.1 | 0.6 |
| 4 | 4.5 | 91.2 | 0.4 | 4.3 | 0.3 |
| 5 | 2.9 | 93.2 | 0.2 | 3.1 | 0.2 |
| 6 | 1.8 | 94.8 | 0.1 | 4.2 | 0.4 |

Products:

| | Pounds |
|---|---|
| Slag | 136 |
| Metal, of the composition corresponding to the Sample 6 | 86 |

Example II

In this test a quantity of brass and bronze shavings containing admixed iron was oxidized with the following results:

| | Percent Sn | Percent Pb | Percent Zn | Percent Cu | Percent Fe |
|---|---|---|---|---|---|
| Metal after melting | 5.4 | 5.8 | 4.4 | 80.9 | 4.8 |
| Blowing air through one tuyère under 5 lbs. pressure, 5 min | 5.7 | 5.0 | 0.8 | 84.8 | |
| Blowing air for 5 min | 5.0 | 4.5 | 0.5 | 89.2 | 1.6 |
| Do | 2.8 | 2.8 | 0.2 | 90.9 | |
| Do | 1.5 | 2.7 | 0.2 | 91.6 | |
| Do | 0.5 | 1.8 | 0.2 | 96.5 | 0.8 |
| Addition of 3 lbs. $SiO_2$ followed by blowing air for 5 min | 0.1 | 1.2 | 0.1 | 98.2 | 0.2 |

The corresponding analyses of slag were as follows:

| | Percent Sn | Percent Zn | Percent Pb | Percent Cu | Percent $SiO_2$ | Percent $Al_2O_3$ | Percent Fe |
|---|---|---|---|---|---|---|---|
| At the end of the— | | | | | | | |
| First blow | 0.4 | 0.8 | 0.9 | 3.2 | 8.7 | 1.6 | 57.1 |
| Second | 1.1 | 1.1 | 2.2 | 6.2 | | | |
| Third | 3.1 | 1.0 | 1.7 | 10.3 | | | |
| Fourth | 3.3 | 1.0 | 1.9 | 7.4 | | | |
| Fifth | 3.9 | 0.8 | 2.1 | 16.7 | | | |
| Sixth | 3.5 | 0.7 | 2.6 | 27.7 | 7.2 | 1.7 | 21.7 |

The following quantified flow sheet illustrates a complete specific cyclic procedure involving the oxidation and reduction operations and in which the slag and metal phases are separated after the oxidation treatment, the slag phase being treated separately by reduction and the metal phase resulting from such reduction treatment being re-treated with initial charge materials.

Example III (The figures in parentheses indicate roughly the relationship of quantities and the analyses are approximate.)

The procedures and specific processes of the invention preferably are so carried out that the metal phase resulting from the oxidation treatment and the metal phase resulting from reduction in contact of the slag and metal phases produced in the oxidation treatment contain not more than about five-tenths of one percent (0.5%) of zinc and not more than about five-tenths of one percent (0.5%) of iron. Reduction of the slag phases resulting from the oxidation treatments preferably are so carried out that the final slag produced contains not more than about one percent (1.0%) of copper, not more than about two-tenths of one percent (0.2%) of tin and not more than about five-tenths of one percent (0.5%) of zinc. It will be understood that the above percentages of iron, copper, zinc and tin represent desirable upper limits of recoveries and losses capable of being achieved in practicing the invention and that the invention contemplates, also, operations in which metals and slags containing greater and lesser amounts of iron, copper, tin and zinc are produced.

The broad process of the invention may be regarded as comprising two general procedures, both including carefully controlled oxidation followed by carefully controlled reduction, but one involving treatment of the molten slag and metal phases of the oxidation treatment in contact and the other involving separation and separate treatment of the molten slag and metal phases. Each of these procedures is separately useful under different conditions. Treatment of the slag and metal phases in contact may be more desirable, for example, when the charge materials contain only small amounts of tin and when volatilization of the tin is desirable. Treatment of the slag and metal phases separately may be more desirable, for example, when the charge materials contain relatively large amounts of tin and when it is desirable to retain a large proportion of the tin in unoxidized condition in the original metal phase. Separate treatment of the slag phase permits more effective reduction of the tin, by permitting reduction to be continued to the point at which considerable iron is reduced, without causing undesirable contamination of the metal phase resulting from the oxidation treatment. The two general procedures are closely related, but in view of their separate usefulness and in view of the fact that more than three species of the broad process require the presentation of claims to provide adequate protection, separate applications covering the two general procedures have been filed. The broad process of the invention and the general procedure involving the treatment of the slag and metal phases in contact are covered by the claims of my application Serial No. 197,608, filed March 23, 1938. The claims of this application are designed to cover the general procedure involving the separate treatment of the slag and metal phases. It will be understood that this line of division, adopted for convenience and in an effort to comply with the Rules of Procedure of the Patent Office, is not to be regarded as limiting the scope of protection sought, or obtained for the invention.

Any suitable apparatus may be employed in carrying out the process of my invention. Apparatus of my invention which may be employed for carrying out the process preferably includes a tiltable furnace. The furnace itself consists of a metal shell lined with suitable refractory material. A preferred form of furnace shell is a large cylinder with its axis disposed horizontally. One end of this cylindrical vessel has a discharge opening for the passage of the waste gases from the furnace to an adjacent boiler followed by a heat exchanger, the boiler being provided for developing steam and the heat exchanger for heating the air blast. The cylindrical furnace is provided with one or more horizontal rows of tuyères which can be submerged below the level of the bath or elevated above it within the range of tiltability or rotation of the vessel. It preferably is provided, also, with another set of tuyères, comparatively few in number relatively to the number of the air tuyères, for use in blowing a reducing agent into a molten bath within the furnace. Means are provided for plugging the reducing agent tuyères when the air tuyères are being used or when such reducing agent tuyères are not being used for blowing but when they might be submerged during the tilting of the vessel. This double tuyères arrangement, one set for oxidizing blast and the other for reducing blast, makes it possible to conduct in one vessel both parts of the broad operation, namely, the oxidizing step and the reducing step, therefore eliminating, in cases where the volume of material to be treated is not large, the necessity for having two vessels, one for oxidizing and the other for reducing. The other end of the cylindrical furnace is equipped with a fuel burner of a suitable nature for providing a flame of extraneous fuel when the character of the bath is such that the use of extraneous fuel is necessary. The double set of tuyères also provides easy means of controlling the atmosphere above the bath when such control is advisable. Suitable openings are provided in the vessel for the charging of the initial materials, side doors being provided of sufficient size to permit the introduction of bales of metal and one or more ports with or without injector devices being provided for the feeding of granular or fine size material.

A preferred form of apparatus of my invention is illustrated in the accompanying drawings, in which.

The apparatus illustrated in the drawings comprises a tiltable furnace 1 having a metal shell 2 and a suitable refractory lining 3, preferably of silica. The furnace is elongated as shown, the main portion thereof being preferably cylindrical with its axis disposed substantially horizontally, one end-portion preferably being flared upwardly and downwardly, and having a refractory end-wall 4 formed around a conduit 5 which is used for circulating a cooling medium to prevent overheating of the wall. Each end of the furnace is provided with riding rings 6 which engage suitable supporting rollers 7, and a ring gear 8 of customary construction is suitably mounted on the furnace shell for use in conjunction with a motor-operated pinion (not shown) in tilting the furnace. One end of the furnace is provided with a tapping spout 9, a device 10, such as a hopper and worm, for charging granular material into the furnace, fuel burning means comprising a nozzle 11 connected to a conduit 12 which leads to any suitable source of powdered, liquid, or gaseous carbonaceous fuel, and an air port 13 surrounding the nozzle which is in direct communication with an air conduit 14. This conduit 14 preferably connects with the furnace at its axial center and is provided with a slip-sealed-joint 15 which enables the furnace to be tilted without disconnecting the conduit. The top of the furnace has an opening 16 for charging coarse or large quantities of material into the gas chamber 17. A tapping or skimming spout 31 is provided at one side of the furnace.

Figure 1:
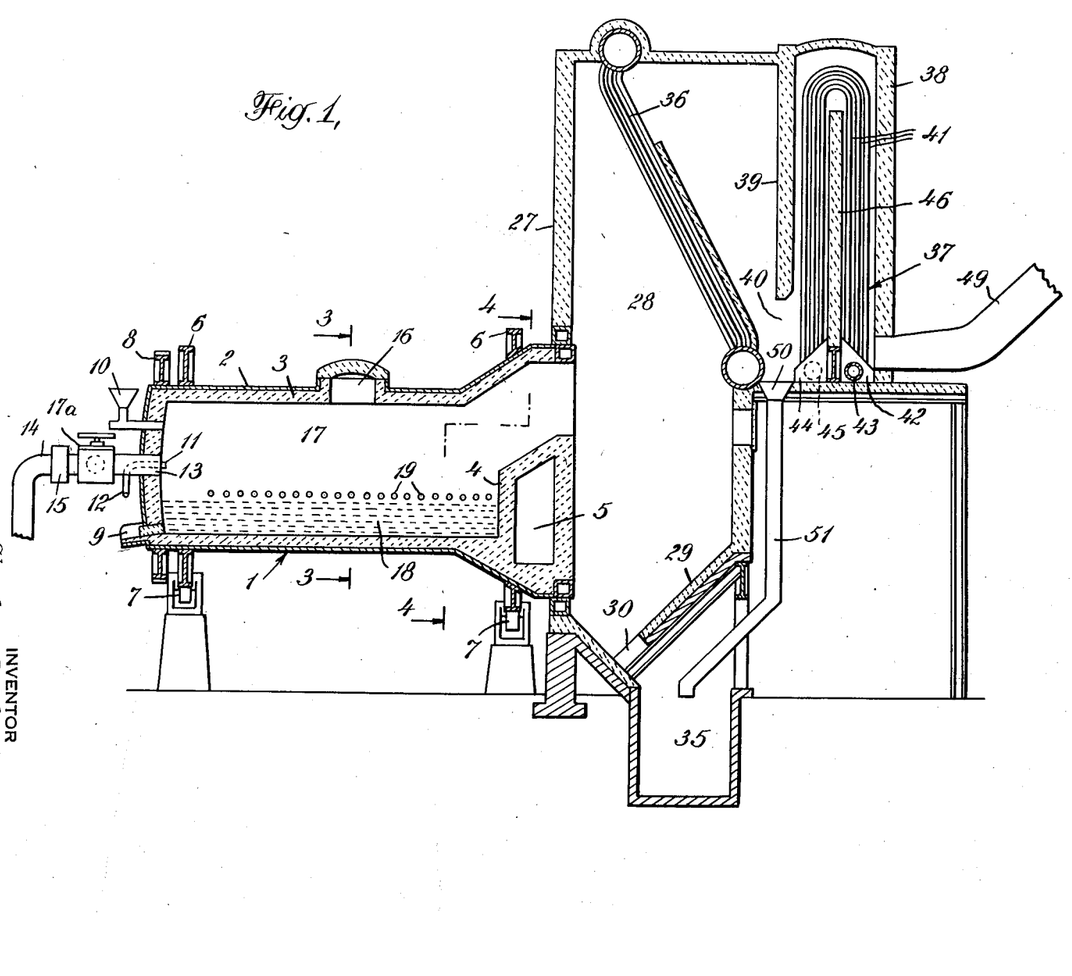
Fig. 1 is a sectional elevation of an arrangement of apparatus in accordance with the invention.
Figures 2, 3, 4, 5:
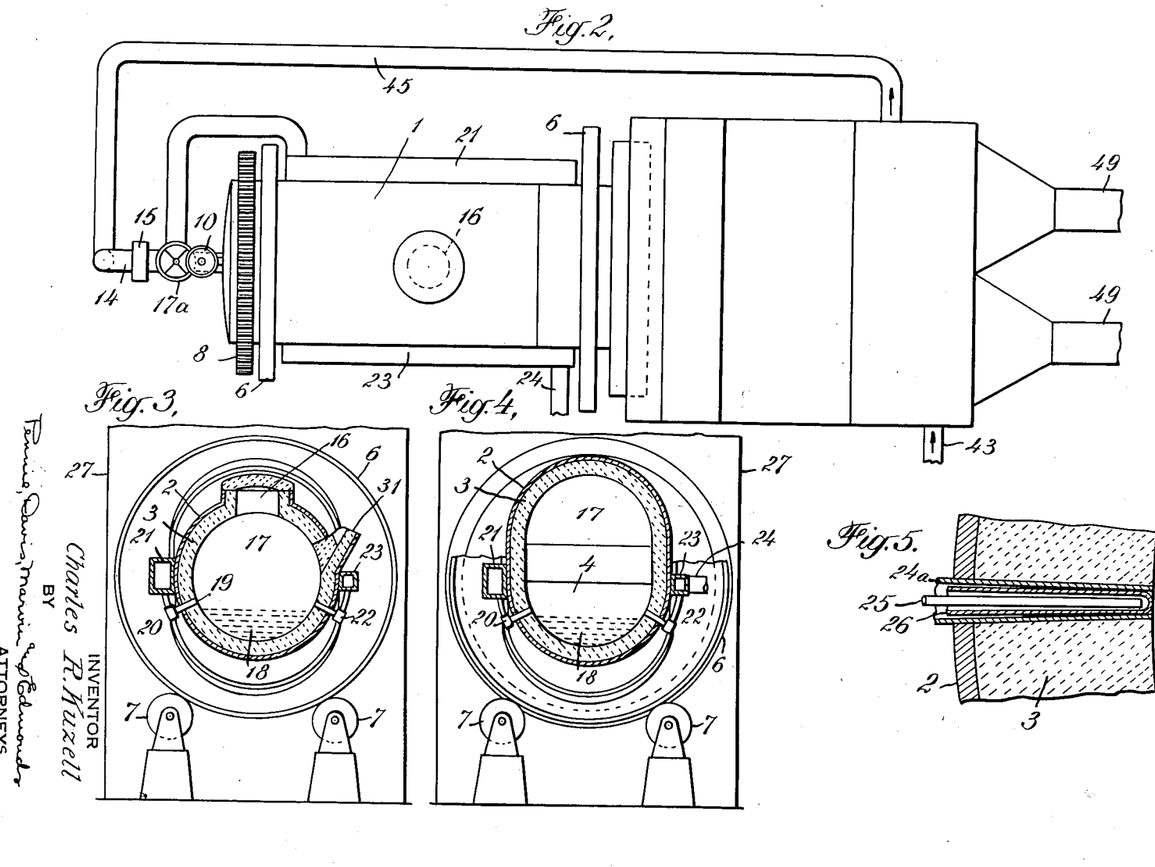
Fig. 2 is a plan of the apparatus shown in Fig. 1.
Fig. 3 is a section taken along the line 3—3 of Fig. 1.
Fig. 4 is a section taken along the line 4—4 of Fig. 1.
Fig. 5 is a section illustrating one construction and arrangement of tuyère and tuyère plugging means which may be used in the apparatus of the invention.

When the furnace is in its upright position and filled with a normal quantity of charge, as shown in the drawings, the upper level of the bath 18 is just below the inner openings 19 of tuyères 20. The tuyères 20 on one side are connected to a wind-box 21 which is connected to the air conduit 14, and the tuyères 22 along the other side are connected to a wind-box 23 which is connected by flexible hose 24 or the like to a source of reducing gas (not shown). A tuyère and plug arrangement suitable for the purpose of the invention is shown in detail in Fig. 5. The tuyère is tapered in the direction of the furnace chamber and comprises a tapered tube or shell 24a in contact with the refractory lining 3. The tuyère plug comprises a tapered pipe member 26, closed at the small end, and adapted to fit tightly within the tuyère tube 24a adjacent its small end, and a pipe 25 extending into the member 26 and adapted to supply gaseous or liquid fluid for cooling the assembly. The pipe 25 is spaced from the walls of the member 26 to permit circulation of the cooling fluid. The conduit 14 is provided with a suitable valve 17a for closing it completely or for selectively admitting air to the tuyères 20 or port 13 separately or simultaneously. At a point above the normal bath level and along one side of the furnace a slag spout 31 is provided.

The flared end-portion of the furnace is inserted into, and in close fit with, an opening in the end wall 27 of the gas-cooling chamber 28. The end-wall 4 of the furnace is sloped upwardly for the purpose of directing the gases from the furnace in an upward direction into chamber 28. This chamber has a sloping bottom 29 with an opening 30 therein for permitting precipitated matter to settle into the trap 35. In the upper portion of the chamber 28 a scalping boiler 36 is arranged. An air preheater is mounted within a suitable housing 38 adjacent the gas-cooling chamber endwall 39. The interior of the housing 38 communicates with the interior of the chamber 28 through an opening 40 in end-wall 39.

The air pre-heater comprises a plurality of ducts 41 through which air is passed in heat exchange relationship with waste gases and fumes from the furnace entering through the passage 40. One side of the ducts is connected to an intake header 42 which connects to a pipe 43 leading to a pump (not shown) adapted to force air from the atmosphere into the ducts, and the other side of the ducts is connected to a discharge header 44 connected by conduit 45 to conduit 14.

The ducts are preferably U-shaped and mounted in inverted position over a dividing wall 46. The hot furnace gases which enter chamber 28 pass upwardly in contact with the scalping boiler, then downwardly and through opening 40, upwardly over the outside of the ducts on one side of the wall 46 then downwardly in contact with the ducts on the other side of the wall 46 and into the conduits 49 which lead to a bag house of the customary type (not shown). A converging receptacle 50 into which precipitated matter may fall is located adjacent the lower portion of the air preheater, just under the opening 40. A discharge pipe 51 connectes this chamber with the trap 35.

Operation of the apparatus of invention will be clear from a consideration of the following brief description of its use in carrying out a process of the invention. It will be understood that the following description is provided for purposes of illustration and not restriction or limitation. The apparatus may be employed for carrying out specific processes of the invention, hereinbefore described, other than that to be described briefly. In carrying out a process in accordance with the invention, a charge of metal-bearing material to be treated (containing, for example, copper, zinc, tin, iron and lead, and in which the copper and zinc are present in the greater proportions) is placed in the furnace 1 through the opening 16. The charge is wholly or completely melted by heat liberated in oxidizing metal of the charge, but as a supplemental heating means any available carbonaceous fuel may be burned in chamber 17. The carbonaceous fuel, either gaseous, liquid or pulverulent, is introduced through the nozzle 11 and the air necessary for combustion (preferably preheated) is introduced through the air port 13. In the event that the furnace is at operating temperature and the charge high in readily oxidizable metals, the combustion heating may be dispensed with and the oxidation treatment carried on by the heat of metal oxidation. After a sufficient pool of metal has formed as a result of combustion heating, the heat of the furnace, or oxidation of the metals from the surrounding gases, the furnace is tilted to submerge the openings 19 and preheated air is blown through the metal thereby effecting a rapid oxidation and melting of the remaining charge. The charge may also be melted wholly or completely by air admitted through the port 13, especially when the furnace is initially at a high temperature. Preferably, the oxidation is controlled during the melting period, to oxidize selectively at least, the more easily oxidizable constituents of the metal as they melt. Various kinds of granular material such as metal turnings and punchings, fuel, reducing agents, or metal and slag ingredients may be passed into the furnace through the charging apparatus 10 as required either during or after melting.

After the charge has melted, a slag forms on the surface thereof from materials such as alumina or silica contained in the charge itself, or from melting refractories, and this slag acquires various other constituents such as oxides of iron, zinc, tin and lead and on the whole is a rather complex component of the bath. It has the power to exert a strong influence on the metal bath beneath and this process aims especially to include the treatment of the slag, not only for the recovery of metals therefrom, but because of its influence upon the metal.

After the charge has melted, the furnace is rolled over on one side to submerge the tuyères along one side which are connected to the preheater, and preheated air is blown through the metal and slag. This oxidation is carried out for the purpose of oxidizing at least a major portion of the zinc and driving it out of the furnace in the form of zinc oxide fume. Although the iron oxidizes preferentially ahead of the other metals, there is an accompanying oxidation of zinc, lead and tin but the lead and tin do not oxidize excessively until the zinc and iron are substantially oxidized. A rather small portion of the tin and lead oxides pass through the slag and accompany the zinc fume. A part of the oxides of tin and lead and nearly all of the oxide of iron dissolve in the slag. In the oxidation of these metals, a considerable quantity of heat is liberated which, together with the heat returned to the furnace from the preheater is sufficient to sustain a considerable part or all of the oxidation stage of the process.

The gaseous products of combustion and the entrained fumes or vapors of metal oxides including the oxides of zinc, tin and lead, are passed into chamber 28 in contact with the scalping boiler 36, through opening 40, upwardly then downwardly in contact with the ducts 41 of the preheater 37 and then into the conduits 49 which lead to a bag house. The absorption of heat in the boiler and air preheater is such as to cool the gases to a point where the oxide fumes will readily precipitate upon reaching the bag house but without undue precipitation in the preheater. The oxides collected in the bag house may be separated or treated by any suitable known means Air is introduced by suitable pumping apparatus from the outside into the intake header 43, through the ducts 41 and into the discharge header 44, from which it flows through conduit 45, to the tuyères 20 or air port 13, as the case may be.

The oxidation treatment is carried out especially to remove a portion of the zinc from the metal and according to a preferred aspect of the invention, the oxidation is continued until there is a perceptible diminution in the evolution of zinc fumes from the bath and the iron is substantially all oxidized. This is the end-point of oxidation, and at this point the slag contains nearly all of the iron as iron oxide, a portion of the tin and lead as oxides and a relatively small amount of zinc oxide. At the end-point most of the zinc oxide has left the metal bath and slag and this is an important factor contributing to the efficacy of the subsequent reduction stage of the treatment.

At the conclusion of the oxidation treatment, the furnace is returned to its upright position, and the metal phase is removed by tapping through the spout 9, the molten slag phase being retained in the furnace. The molten metal tapped from the furnace preferably is cast in anode form and treated electrolytically.

The oxidized slag bath retained in the furnace is subjected to the reduction treatment of the process and this may be done in a number of ways. For example, powdered coke or coal may be added to the slag and a part thereof burned by air admitted to chamber 17, reducing gaseous or liquid fuels may be passed into the chamber through the nozzle 11, or the furnace may be tilted to one side and a reducing gas passed from the tuyères 22 through the molten slag. Since the slag is substantially free of zinc oxide, the tin oxide therein is especially amenable to reduction. As the reduction proceeds, a new metal phase or bath is formed, and the tin and lead are very effectively reduced from the slag and enter the metal phase. During reduction, the oxides of zinc and iron which remain in the bath are also substantially reduced. If the reduced metals are volatile at the prevailing temperatures, they rise from the bath and enter the gases leaving the furnace, wherein they are reoxidized. Zinc is a metal of this type, and, as fast as its oxide is reduced from the slag bath, it vaporizes and enters the gases, thus effecting its further elimination or dissection from the other metals. At this point it will be desirable but not necessary to introduce secondary air for consuming the unburned combustible materials from the reducing agent and also for oxidizing the metallic zinc back to a zinc oxide fume which will proceed through the cooling apparatus comprising the scalping boiler and air preheater and will be collected in the bag house, or even a Cottrell type electrical precipitating plant or other device provided for its separation.

At the conclusion of the reduction stage of the process just described, the components of the metal phase may be separated and recovered by subsequent appropriate treatment. In one desirable form of treatment, as illustrated in Example III above, the slag is scraped or skimmed off the metal or poured out of the spout 31 and the metal is retained in the furnace to form the nucleus of a new charge for treatment. The slag may be discarded or sent to an ore smelting reverberatory for the recovery of whatever metal may be removed by that treatment.

In carrying out a process of the type illustrated in Example III, involving separate reduction of the slag phase produced in the oxidation treatment and involving retention of the new metal phase in the furnace to form a nucleus for a new charge, it may be desirable or advisable to so control the reducing treatment as to effect reduction to the metallic state of a considerable amount of any iron present when tin also is present. The reduction of a considerable amount of the iron insures more complete reduction of the tin. The metallic iron thus produced will not impair the efficiency of the cyclic process, as it will be oxidized and thus eliminated in the subsequent oxidation treatment of the new charge of which it forms a part.

The utility of the apparatus in carrying out processes involving controlled oxidation and processes involving the use of volatilizing agents such as sulphur and chlorine yielding substances in accordance with the invention will be clearly apparent from a consideration of the above description of its use in carrying out oxidation and reduction operations.

I claim:

1. The method of treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, and subjecting the slag to the action of a reducing agent while molten to reduce zinc oxide contained therein and to vaporize the resulting elemental zinc.

2. The method of treating a copper base alloy containing zinc to separate the copper and zinc which comprises forming a molten bath of the alloy in a suitable receptacle, blowing an oxidizing gas through the molten bath to oxidize the zinc contained therein and to sweep out of the receptacle a portion of the oxidizing zinc, thus producing a residual molten bath comprising a molten metal phase containing copper and a molten oxide or slag phase containing zinc oxide, separating the metal and slag phases of the bath, and subjecting the slag while molten in a suitable receptacle to the action of a reducing agent to reduce to the elemental state zinc contained therein in oxide form and to drive out of the receptacle the zinc thus reduced.

3. The method of treating a copper base alloy containing zinc to separate the copper and zinc which comprises forming a molten bath of the alloy in a suitable receptacle, blowing an oxidizing gas through the molten bath to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, placing a solid reducing agent in contact with the molten slag, and blowing air through the molten slag in contact with the solid reducing agent to effect partial combustion of the reducing agent with the production of a reducing atmosphere to reduce oxidized zinc contained in the residual molten material and to vaporize the resulting elemental zinc.

4. The method of treating a copper base alloy containing zinc to separate the copper and zinc which comprises forming a molten bath of the alloy in a suitable receptacle, blowing an oxidizing gas through the molten bath to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, blowing a reducing agent through the molten slag phase in a suitable receptacle to reduce to the elemental state zinc contained therein in oxide form and to sweep out of the receptacle the zinc thus reduced, and introducing an oxidizing gas into the receptacle above the bath during the reducing treatment to oxidize zinc vapor and unconsumed reducing agent issuing from the bath.

5. The method of treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, subjecting the slag while molten to the action of a reducing agent in a suitable receptacle to reduce to the elemental state zinc and tin contained therein in oxide form and to vaporize and remove from the receptacle zinc thus reduced, thus forming a metallic phase containing tin, and treating the resulting metal product to recover the tin contained therein.

6. The method of treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing a reducing agent through the slag while molten in a suitable receptacle to reduce to the elemental state zinc and tin contained therein in oxide form and to sweep out of the receptacle zinc thus reduced, thus forming a metallic phase containing tin, and treating the resulting metal product to recover the tin contained therein.

7. The method of treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing air through the molten slag in contact with a reducing agent to effect partial combustion of the reducing agent with the production of a reducing atmosphere to reduce to the elemental state tin and zinc contained therein and to vaporize the resulting elemental zinc, thus forming a metallic phase containing tin, and treating the resulting metal product to recover the tin contained therein.

8. The method of treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing a reducing agent through the molten slag in a suitable receptacle to reduce to the elemental state zinc and tin contained therein in oxide form and to sweep out of the receptacle zinc thus reduced, thus forming a metallic phase containing tin, and subjecting the resulting product to the action of an agent capable of reacting with the tin contained therein to produce a volatile compound of tin, thereby to provide for the recovery of tin.

9. The method of treating metal-bearing material of secondary origin containing copper, tin and zinc which comprises forming a molten bath of the material in a suitable receptacle, blowing an oxidizing gas through the molten bath to oxidize the zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing a reducing agent through the molten slag in a suitable receptacle to reduce to the elemental state zinc and tin contained therein in oxide form and to sweep out of the receptacle zinc thus reduced, thus forming a metallic phase containing tin, subjecting the resulting product while molten to the action of a sulphur yielding substance to form volatile tin sulphide, and passing a gas through the molten material to sweep out of the bath tin sulphide thus formed.

10. The method of treating metal-bearing material of secondary origin containing copper, tin and zinc which comprises forming a molten bath of the material in a suitable receptacle, blowing an oxidizing gas through the molten bath to oxidize the zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing a reducing agent through the molten slag in a suitable receptacle to reduce to the elemental state zinc and tin contained therein in oxide form and to sweep out of the receptacle zinc thus reduced, thus forming a metallic phase containing tin, subjecting the resulting product while molten to the action of a sulphur yielding substance to form volatile tin sulphide, passing a gas through molten material to sweep out of the bath tin sulphide thus formed, and maintaining an oxidizing atmosphere above the bath to convert tin sulphide to tin oxide.

11. The method of treating metal-bearing material of secondary origin containing copper, tin and zinc which comprises forming a molten bath of the material in a suitable receptacle, blowing an oxidizing gas through the molten bath to oxidize the zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, blowing a reducing agent through the molten slag in a suitable receptacle to reduce to the elemental state zinc and tin contained therein in oxide form and to sweep out of the receptacle zinc thus reduced, thus forming a metallic phase containing tin, and subjecting the resulting product to the action of an agent capable of reacting with the tin contained therein to produce volatile tin chloride, thereby to provide for the removal of tin from the receptacle.

12. The method of treating metal-bearing material of secondary origin containing copper, tin and zinc which comprises forming a molten bath of the material in a suitable receptacle, blowing an oxidizing gas through the molten bath to oxidize the zinc and tin contained therein and to sweep out of the receptacle a portion of the oxidized zinc, thus producing a residual molten bath comprising a metallic phase containing copper and an oxide or slag phase containing copper oxide, zinc oxide and tin oxide, separating the metal and slag phases of the bath, blowing a reducing agent through the molten slag in a suitable receptacle to reduce to the elemental state zinc and tin contained therein in oxide form and to sweep out of the receptacle zinc thus reduced, thus forming a metallic phase containing copper and tin, casting the resulting metal product into forms suitable for use as anodes in an electrolytic operation, and treating the anodes by electrolysis to recover copper in elemental form and to separate the tin in the form of a slime.

13. The method of treating metal-bearing material of secondary origin containing copper, tin, zinc and iron which comprises forming a molten bath of the material in a suitable receptacle, blowing an oxidizing gas through the molten bath to oxidize substantially all of the zinc and iron and a portion of the tin contained therein and to sweep out of the receptacle a portion of the oxidized zinc, thus producing a residual molten bath comprising a metallic phase containing copper and an oxide or slag phase containing oxides of tin, zinc and iron, separating the metal and slag phases of the bath, blowing a reducing agent through the molten slag in a suitable receptacle to reduce to the elemental state zinc present therein as zinc oxide and to sweep out of the receptacle zinc thus reduced, and blowing a reducing agent through the bath in the presence of a sulphur-yielding material to reduce to the elemental state tin present in the slag as tin oxide and to produce and sweep out of the receptacle tin sulphide.

14. The method of treating metal-bearing material of secondary origin containing copper, tin, zinc and iron which comprises forming a molten bath of the material in a suitable receptacle, blowing an oxidizing gas through the molten bath to oxidize substantially all of the zinc and iron and a portion of the tin contained therein and to sweep out of the receptacle a portion of the oxidized zinc, thus producing a residual molten bath comprising a metallic phase containing copper and an oxide or slag phase containing oxides of tin, zinc and iron, separating the metal and slag phases of the bath, blowing a reducing agent through the molten slag in a suitable receptacle to reduce to the elemental state zinc present in the slag as zinc oxide and to sweep out of the receptacle zinc thus reduced, blowing a reducing agent through the bath in the presence of a sulphur-yielding material to reduce to the elemental state tin present in the slag as tin oxide and to produce and sweep out of the receptacle tin sulphide, and maintaining an oxidizing atmosphere above the bath to convert to tin oxide the tin sulphide issuing from the bath.

15. The method of treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide, separating the metal slag phases of the bath, and subjecting the slag while molten to the action of a reducing agent to reduce zinc oxide contained therein and to vaporize the resulting elemental zinc, the initial charge materials being selected to provide oxidizable metals in sufficient quantity to permit the oxidizing treatment to be carried out without the use of extraneous fuel.

16. The method of treating metal-bearing material of secondary origin containing copper, tin, zinc and iron which comprises forming a molten bath of the material in a suitable receptacle, blowing an oxidizing gas through the molten bath to oxidize zinc, tin and iron contained therein and to sweep out of the receptacle a portion of the oxidized zinc, thus producing a residual molten bath comprising a metallic phase containing copper and an oxide or slag phase containing oxides of tin, zinc and iron, separating the metal and slag phases of the bath, blowing a reducing agent through the slag while molten in a suitable receptacle to reduce to the elemental state zinc present in the slag phase as zinc oxide and to sweep out of the receptacle zinc thus reduced, and blowing a reducing agent through the slag bath in the presence of a sulphur-yielding material to reduce to the elemental state tin present in the slag phase as tin oxide and to produce and sweep out of the bath tin sulphide, the initial charge materials being selected to provide oxidizable metals in sufficient quantity to permit the oxidizing treatment to be carried out without the use of extraneous fuel.

17. The method of treating a copper base alloy containing zinc to separate the copper and zinc which comprises forming a molten bath of the alloy in a suitable receptacle, blowing an oxidizing gas through the molten bath to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, and blowing a reducing agent through the slag while molten in a suitable receptacle to reduce to the elemental state zinc contained therein in oxide form and to sweep out of the receptacle the zinc thus reduced, the initial charge materials being selected to provide oxidizable metals in sufficient quantity to permit the oxidizing treatment to be carried out without the use of extraneous fuel.

18. The method of treating metal-bearing material of secondary origin containing copper, tin, zinc, and iron which comprises forming a molten bath of the material in a suitable receptacle, blowing an oxidizing gas through the molten bath to oxidize the zinc, tin and iron contained therein and to sweep out of the receptacle a portion of the oxidized zinc, thus producing a residual molten bath comprising a metallic phase containing copper and an oxide or slag phase containing oxides of tin, zinc and iron, separating the slag and metal phases of the bath, blowing a reducing agent through the slag in the form of a molten bath to reduce to the elemental state zinc present in the slag as zinc oxide and to sweep out of the receptacle zinc thus reduced, blowing a reducing agent through the slag bath in the presence of a sulphur-yielding material to reduce to the elemental state tin present in the slag as tin oxide and to produce and sweep out of the bath tin sulphide, and maintaining an oxidizing atmosphere above the slag bath to convert to tin oxide the tin sulphide issuing from the bath, the initial charge materials being selected to provide oxidizable metals in sufficient quantity to permit the oxidizing treatment to be carried out without the use of extraneous fuel.

19 The method of treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, and subjecting the slag while molten to the action of a reducing agent to reduce zinc oxide contained therein and to vaporize the resulting elemental zinc, the oxidizing operation being so controlled as to effect substantially complete oxidation of the zinc with the production of a metallic copper product containing not more than about 0.5 per cent of zinc.

20. The method of treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing copper oxide, zinc oxide and tin oxide, separating the metal and slag phases of the bath, subjecting the slag in the form of a molten bath to the action of a reducing agent to reduce to the elemental state zinc and tin contained therein in oxide form and to vaporize and remove from the receptacle zinc thus reduced, thus forming a metallic phase containing copper and tin, and treating the resulting metal product to separate the copper and tin contained therein, the oxidizing operation being so controlled as to effect substantially complete oxidation of the zinc with the production of a metallic copper product containing not more than about 0.5 per cent of zinc and the reducing operation being so controlled that slag produced therein contains not more than about 0.5 per cent of zinc and not more than about 0.2 per cent of tin.

21. A cyclic process for treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide and copper oxide, separating the metal and slag phases of the bath, subjecting the slag while molten to the action of a reducing agent to reduce zinc oxide contained therein and vaporize the resulting elemental zinc and to produce a molten bath comprising a new metal phase containing copper and a slag phase substantially free of copper and zinc, and utilizing the new metal phase containing copper as part of another charge for treatment in the process.

22. A cyclic process for treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide and copper oxide, separating the metal and slag phases of the bath, subjecting the slag while molten to the action of a reducing agent to reduce zinc oxide contained therein and vaporize the resulting elemental zinc and to produce a molten bath comprising a new metal phase containing copper and a slag phase substantially free of copper and zinc, and utilizing the new metal phase containing copper as part of another charge for treatment in the process, the reducing operation being so controlled as to produce a slag containing not more than about 1.0 percent of copper and not more than about 0.5 percent of zinc.

23. A cyclic process for treating a copper base alloy containing zinc to separate the copper and zinc which comprises forming a molten bath of the alloy in a suitable receptacle, subjecting the molten alloy to the action of an oxidizing gas to oxidize the zinc contained therein and to sweep out of the receptacle a portion of the oxidized zinc, thus producing a residual molten bath comprising a molten metal phase containing copper and a molten oxide or slag phase containing zinc oxide and copper oxide, separating the metal and slag phases of the bath, subjecting the slag while molten to the action of a reducing agent to reduce zinc oxide contained therein and vaporize the resulting elemental zinc and to produce a molten bath comprising a new metal phase containing copper and a slag phase substantially free of copper and zinc, and utilizing the new metal phase containing copper as part of another charge for treatment in the process, the reducing operation being so controlled as to produce a slag containing not more than about 1.0 percent of copper and not more than about 0.5 percent of zinc and the oxidizing operation being so controlled as to produce a metal phase containing copper and not more than about 0.5 percent of zinc.

24. A cyclic process for treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, subjecting the slag while molten to the action of a reducing agent in a suitable receptacle to reduce to the elemental state zinc and tin contained therein in oxide form and to vaporize and remove from the receptacle zinc thus reduced, thus forming a metallic phase containing tin and a slag phase substantially free of zinc and tin, and utilizing the metallic phase containing tin as part of another charge for treatment in the process.

25. A cyclic process for treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, subjecting the slag while molten to the action of a reducing agent in a suitable receptacle to reduce to the elemental state zinc and tin contained therein in oxide form and to vaporize and remove from the receptacle zinc thus reduced, thus forming a metallic phase containing tin and a slag phase substantially free of zinc and tin, and utilizing the metallic phase containing tin as part of another charge for treatment in the process, the reducing operation being so controlled as to produce a slag containing not more than about 0.5 per cent of zinc and not more than about 0.2 per cent of tin.

26. A cyclic process for treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, subjecting the slag while molten to the action of a reducing agent in a suitable receptacle to reduce to the elemental state zinc and tin contained therein in oxide form and to vaporize and remove from the receptacle zinc thus reduced, thus forming a metallic phase containing tin and a slag phase substantially free of zinc and tin, and utilizing the metallic phase containing tin as part of another charge for treatment in the process, the reducing operation being so controlled as to produce a slag containing not more than about 0.5 percent of zinc and not more than about 0.2 percent of tin, and the oxidizing operation being so controlled as to produce a metallic phase containing a substantial amount of the tin present in the original charge and a relatively small amount of zinc.

27. A cyclic process for treating metal-bearing material of secondary origin containing copper, tin and zinc which comprises forming a molten bath of the material in a suitable receptacle, blowing an oxidizing gas through the molten bath to oxidize zinc and tin contained therein and to sweep out of the receptacle a portion of the oxidized zinc, thus producing a residual molten bath comprising a metallic phase containing copper and an oxide or slag phase containing zinc oxide and tin oxide, separating the metal and slag phases of the bath, subjecting the slag while molten to the action of a reducing agent in a suitable receptacle to reduce to the elemental state zinc and tin contained therein in oxide form and to vaporize and remove from the receptacle zinc thus reduced, thus forming a metallic phase containing tin and a slag phase substantially free of zinc and tin, and utilizing the metallic phase containing tin as part of another charge for treatment in the process, the reducing operation being so controlled as to produce a slag containing not more than about 0.5 percent of zinc and not more than about 0.2 percent of tin and the oxidizing operation being so controlled as to produce a metallic phase containing a substantial amount of the tin present in the original charge and not more than about 0.5 percent of zinc.

28. A cyclic process for treating metal-bearing material of secondary origin containing copper, tin and zinc which comprises forming a molten bath of the material in a suitable receptacle, blowing an oxidizing gas through the molten bath to oxidize zinc, tin and copper contained therein and to sweep out of the receptacle a portion of the oxidized zinc, thus producing a residual molten bath comprising a metal phase containing copper and a slag phase containing oxides of copper, tin and zinc, separating the metal and slag phases of the bath, subjecting the slag while molten to the action of a reducing agent to reduce to the metallic state copper, zinc and tin contained therein in oxide form and to vaporize zinc thus reduced, thus forming a metal phase containing copper and tin and a slag phase substantially free of copper, zinc and tin, and utilizing the metal phase containing copper and tin as a part of another charge for treatment in the process.

29. A cyclic process for treating metal-bearing material of secondary origin containing copper, tin and zinc which comprises forming a molten bath of the material in a suitable receptacle, blowing an oxidizing gas through the molten bath to oxidize zinc, tin and copper contained therein and to sweep out of the receptacle a portion of the oxidized zinc, thus producing a residual molten bath comprising a metal phase containing copper and a slag phase containing oxides of copper, tin and zinc, separating the metal and slag phases of the bath, subjecting the slag while molten to the action of a reducing agent in the presence of an agent capable of reacting with metallic tin to produce a volatile compound of tin, thereby to reduce to the metallic state copper, tin and zinc contained in the slag in oxide form and to vaporize tin and zinc thus reduced, thus forming a metal phase containing copper and a slag phase substantially free of copper, tin and zinc, and utilizing the metal phase containing copper as a part of another charge for treatment in the process.

30. A cyclic process for treating metal-bearing material of secondary origin containing iron, copper, tin and zinc which comprises forming a molten bath of the material in a suitable receptacle, blowing an oxidizing gas through the molten bath to oxidize iron, zinc, tin and copper contained therein and to sweep out of the receptacle a portion of the oxidized zinc, thus producing a residual molten bath comprising a metal phase containing copper and a slag phase containing oxides of copper, iron, tin and zinc, separating the metal and slag phases of the bath, subjecting the slag while molten to the action of a reducing agent to reduce to the metallic state iron, copper, zinc and tin contained therein in oxide form and to vaporize zinc thus reduced, thus forming a metal phase containing iron, copper and tin and a slag phase substantially free of copper, zinc and tin and utilizing the metal phase containing iron, copper and tin as a part of another charge for treatment in the process.

31. A cyclic process for treating metal-bearing material of secondary origin containing iron, copper, tin and zinc which comprises forming a molten bath of the material in a suitable receptacle, blowing an oxidizing gas through the molten bath to oxidize iron, zinc, tin and copper contained therein and to sweep out of the receptacle a portion of the oxidized zinc, thus producing a residual molten bath comprising a metal phase containing copper and a slag phase containing oxides of copper, iron, tin and zinc, separating the metal and slag phases of the bath, subjecting the slag while molten to the action of a reducing agent in the presence of an agent capable of reacting with metallic tin to produce a volatile compound of tin, thereby to reduce to the metallic state iron, copper, tin and zinc contained in the slag in oxide form and to vaporize tin and zinc thus reduced, thus forming a metal phase containing iron and copper and a slag phase substantially free of copper, tin and zinc, and utilizing the metal phase containing iron and copper as a part of another charge for treatment in the process.

32. The method of treating a copper base alloy containing zinc to separate the copper and zinc which comprises forming a molten bath of the alloy in a suitable receptacle, blowing an oxidizing gas through the molten bath to oxidize the zinc contained therein and to sweep out of the receptacle a portion of the oxidized zinc, thus producing a residual molten bath comprising a molten metal phase containing copper and a molten oxide or slag phase containing zinc oxide, separating the metal and slag phases of the bath, blowing a reducing agent through the molten slag phase in a suitable receptacle to reduce to the elemental state zinc contained therein in oxide form and to sweep out of the receptacle the zinc thus reduced.

33. The method of treating metal-bearing material of secondary origin containing copper, tin, zinc and iron which comprises forming a molten bath of the material in a suitable receptacle, subjecting the molten bath to the action of an oxidizing gas to oxidize the zinc contained therein and to sweep out of the receptacle a portion of the oxidized zinc in the presence of a slag containing iron oxide and silica, separating the slag and subjecting the slag while in a molten condition to the action of a reducing agent to reduce zinc oxide contained therein and to vaporize the resulting elemental zinc.

CHARLES R. KUZELL.